(12) United States Patent
Han et al.

(10) Patent No.: US 11,705,932 B2
(45) Date of Patent: Jul. 18, 2023

(54) CIRCUITS FOR INTERMEDIATE-FREQUENCY-FILTERLESS, DOUBLE-CONVERSION RECEIVERS

(71) Applicants: Guoxiang Han, New York, NY (US); Peter R. Kinget, Summit, NJ (US); Tanbir Haque, New York, NY (US)

(72) Inventors: Guoxiang Han, New York, NY (US); Peter R. Kinget, Summit, NJ (US); Tanbir Haque, New York, NY (US)

(73) Assignee: The Trustees of Columbia University In the City of New York, New York, NY (US)

( * ) Notice: Subject to any disclaimer, the term of this patent is extended or adjusted under 35 U.S.C. 154(b) by 113 days.

(21) Appl. No.: 17/176,349

(22) Filed: Feb. 16, 2021

(65) Prior Publication Data
US 2021/0258030 A1    Aug. 19, 2021

Related U.S. Application Data

(60) Provisional application No. 63/130,070, filed on Dec. 23, 2020, provisional application No. 62/977,007, filed on Feb. 14, 2020.

(51) Int. Cl.
| | |
|---|---|
| *H04B 1/12* | (2006.01) |
| *H04B 1/18* | (2006.01) |
| *H04B 1/30* | (2006.01) |
| *H04L 25/08* | (2006.01) |

(52) U.S. Cl.
CPC ............... *H04B 1/12* (2013.01); *H04B 1/18* (2013.01); *H04B 1/30* (2013.01); *H04B 2001/307* (2013.01); *H04L 25/08* (2013.01)

(58) Field of Classification Search
CPC ... H04B 1/12; H04B 1/18; H04B 1/30; H04B 2001/307; H04L 25/08
See application file for complete search history.

(56) References Cited

U.S. PATENT DOCUMENTS

| | | | |
|---|---|---|---|
| 6,335,952 B1 * | 1/2002 | Lee | H03D 7/1441 375/327 |
| 2004/0151109 A1 * | 8/2004 | Batra | H04L 1/0071 370/208 |
| 2005/0070242 A1 | 3/2005 | Davis | |

(Continued)

OTHER PUBLICATIONS

Abidi, A.A., "Direct-Conversion Radio Transceivers for Digital Communications", in IEEE J. Solid-State Circuits, vol. 30, No. 12, Dec. 1995, pp. 1399-1410.

(Continued)

*Primary Examiner* — Junpeng Chen
(74) *Attorney, Agent, or Firm* — Byrne Poh LLP

(57) ABSTRACT

Circuits for a receiver, comprising: M first mixers that each receive an input signal, that are each clocked by a different phase of a first common clock frequency, and that each provide an output, wherein M is a count of the first mixers; and M sets of N second mixers, wherein N is a count of the second mixers in each of the M sets, wherein each second mixer in each set of N second mixers receives as an input the output of a corresponding one of the M first mixers, wherein each of the N second mixers in each of the M sets are clocked by a different phase of a second common clock frequency, and wherein each of the second mixers has an output.

9 Claims, 13 Drawing Sheets

(56) References Cited

U.S. PATENT DOCUMENTS

| | | | |
|---|---|---|---|
| 2012/0219080 A1* | 8/2012 | Brunner | H04L 25/0222 375/261 |
| 2018/0287559 A1 | 10/2018 | Zhu et al. | |
| 2019/0207288 A1 | 7/2019 | Zhu et al. | |
| 2020/0274522 A1 | 8/2020 | Karmaker | |

OTHER PUBLICATIONS

Andrews, C., et al., "Implications of Passive Mixer Transparency for Impedance Matching and Noise Figure in Passive Mixer-First Receivers", In IEEE Trans. on Circuits and Systems I: Regular Papers, vo. 57, No. 12, Dec. 2010, pp. 3092-3103.

Cadence, "Spectre Circuit Simulation Tool", last accessed Mar. 13, 2023, pp. 1-5, available at: https://www.cadence.com.

Chen, R., et al., "Reconfigurable Receiver with Radio-Frequency Current-Mode Complex Signal Processing Supporting Carrier Aggregation", in IEEE Journal of Solid-State Circuits, vol. 50, No. 12, Dec. 2015, pp. 3032-3046.

Darabi, H., et al., "Noise in RF-CMOS Mixers: a simplephysical model", in IEEE J. Solid-State Circuits, vol. 35, No. 1, Jan. 2000, pp. 15-25.

Darvishi, M., et al., "Widely Tunable 4th Order Switched Gm-C band-pass Filter based on N-path Filters", in IEEE J. Solid-State Circuits, vol. 47, Dec. 2012, pp. 3105-3119.

Elmaghraby, A., et al., "A Double Bandpass N-path Filter for LTE Carrier Aggregation Receivers in 28nm CMOS", in WAMICON 2014, Jun. 2014, pp. 1-3.

Fabiano, I., et al., "SAW-less Analog Front-end Receivers for TDD and FDD", in IEEE J. Solid-State Circuits, vol. 48, No. 12, Dec. 2013, pp. 3067-3079.

Han, G., et al., "A 0.3-to-1.3GHz Multi-Branch Receiver with Modulated Mixer Clocks for Concurrent Dual-Carrier Reception and Rapid Compressive-Sampling Spectrum Scanning," in 2019 IEEE Radio Frequency Integrated Circuits Symposium (RFIC), Jun. 2019, pp. 95-98.

Kasri, R., et al., "A Digital Sine-Weighted Switched-Gm Mixer for Singleclock Power-Scalable Parallel Receivers", in 2017 IEEE CICC Conference, Apr. 30-May 3, 2017, pp. 1-4.

Klumperink, E.A.M., et al., "Software Defined Radio Receivers Exploiting Noise Cancelling: A tutorial review", in IEEE Communications Magazine, vol. 52, No. 10, Oct. 2014, pp. 111-117.

Mirzaei, A., et al., "Architectural Evolution of Integrated M-phase high-Q Bandpass Filters", in IEEE Trans. Circuits and Systems I, vol. 59, No. 1, Jan. 2012, pp. 52-65.

Murphy, D., et al., "A Blocker-Tolerant, Noise-Cancelling Receiver Suitable for Wideband Wireless Applications", in IEEE J. Solid-State Circuits, vol. 47, No. 12, Dec. 2012, pp. 2943-2963.

Murphy, D., et al., "A Noise-Cancelling Receiver Resilient to Large Harmonic Blockers", In IEEE J. Solid-State Circuits, vol. 50, No. 6, Jun. 2015, pp. 1336-1350.

Murphy, D., et al., "An LTV Analysis of the Frequency Translational Noise-Cancelling Receiver", in IEEE Trans. Circuits and Systems I, vol. 61, No. 1, Jan. 2014, pp. 266-279.

Pehlke, D.R., et al., "LTE-Advanced Pro RF Front-End Implementations to Meet Emerging Carrier Aggregation and DL MIMO Requirement", in IEEE Communications Magazine, vol. 55, No. 4, Apr. 2017, pp. 134-141.

Piazza, F., et al., "A 1.57GHz RF Front-End for Triple Conversion GPS Receiver", in IEEE J. Solid-State Circuits, vol. 33, No. 2, Feb. 1998, pp. 202-209.

Razavi, B., "Design Considerations for Direct-Conversion Receivers", in IEEE Transactions on Circuits and Systems II, vol. 44, No. 6, Jun. 1997, pp. 428-435.

Rice, S.O., "Mathematical Analysis of Random Noise," The Bell System Technical Journal, vol. 23, No. 3, Jan. 1945, pp. 282-332.

Stetzler, T.D., et al., "A 2.7-4.5V Single-Chip GSM Transceiver RF Integrated Circuit", in IEEE J. Solid-State Circuits, vol. 30, No. 12, Dec. 1995, pp. 1421-1429.

Sundstrom, L. et al., "A Receiver for LTE Rel-11 and Beyond Supporting Non-Contiguous Carrier Aggregation", In IEEE International Solid-State Circuits Conference Digest of Technical Papers (ISSCC), Feb. 17, 2013, pp. 336-337.

Wu, H., et al., "A Harmonic-Selective Multi-Band Wireless Receiver with Digital Harmonic Rejection Calibration", in IEEE Journal of Solid-State Circuits, vol. 54, No. 3, Mar. 2019, pp. 796-807.

Xu, Y., et al., "A Blocker-Tolerant RF Front End with Harmonic-Rejecting N-path Filter", In IEEE J. Solid-State Circuits, vol. 53, No. 2, Feb. 2018, pp. 327-339.

Yang, D., et al., "Optimized Design of N-phase Passive Mixer-First Receivers in Wideband Operation", in IEEE Trans. Circuits and Systems I, vol. 62, No. 11, Nov. 2015, pp. 2759-2770.

Zhu, J., et al., "Frequency-Translational Quadrature-Hybrid Receivers for Very-Low-Noise, Frequency-Agile, Scalable Inter-Band Carrier Aggregation", in IEEE Journal of Solid-State Circuits, vol. 51, issue 12, Dec. 2016, pp. 3137-3151.

Office Action dated Mar. 15, 2023 in U.S. Appl. No. 17/561,622, pp. 1-23.

* cited by examiner

| Addr<4:0> | SRAM Table (In-Phase) MAG | POL | Addr<4:0> | SRAM Table (In-Phase) MAG | POL |
|---|---|---|---|---|---|
| 5'b00000 | 5'b11111 | 1'b1 | 5'b10000 | 5'b11111 | 1'b0 |
| 5'b00001 | 5'b11110 | 1'b1 | 5'b10001 | 5'b11110 | 1'b0 |
| 5'b00010 | 5'b11101 | 1'b1 | 5'b10010 | 5'b11101 | 1'b0 |
| 5'b00011 | 5'b11010 | 1'b1 | 5'b10011 | 5'b11010 | 1'b0 |
| 5'b00100 | 5'b10110 | 1'b1 | 5'b10100 | 5'b10110 | 1'b0 |
| 5'b00101 | 5'b10001 | 1'b1 | 5'b10101 | 5'b10001 | 1'b0 |
| 5'b00110 | 5'b01100 | 1'b1 | 5'b10110 | 5'b01100 | 1'b0 |
| 5'b00111 | 5'b00110 | 1'b1 | 5'b10111 | 5'b00110 | 1'b0 |
| 5'b01000 | 5'b00000 | 1'b0 | 5'b11000 | 5'b00000 | 1'b1 |
| 5'b01001 | 5'b00110 | 1'b0 | 5'b11001 | 5'b00110 | 1'b1 |
| 5'b01010 | 5'b01011 | 1'b0 | 5'b11010 | 5'b01011 | 1'b1 |
| 5'b01011 | 5'b10001 | 1'b0 | 5'b11011 | 5'b10001 | 1'b1 |
| 5'b01100 | 5'b10101 | 1'b0 | 5'b11100 | 5'b10101 | 1'b1 |
| 5'b01101 | 5'b11001 | 1'b0 | 5'b11101 | 5'b11001 | 1'b1 |
| 5'b01110 | 5'b11100 | 1'b0 | 5'b11110 | 5'b11100 | 1'b1 |
| 5'b01111 | 5'b11110 | 1'b0 | 5'b11111 | 5'b11110 | 1'b1 |

FIG. 10

| Addr<4:0> | SRAM Table (Quad-Phase) MAG | POL | Addr<4:0> | SRAM Table (Quad-Phase) MAG | POL |
|---|---|---|---|---|---|
| 5'b00000 | 5'b00000 | 1'b1 | 5'b10000 | 5'b00000 | 1'b0 |
| 5'b00001 | 5'b00110 | 1'b1 | 5'b10001 | 5'b00110 | 1'b0 |
| 5'b00010 | 5'b01100 | 1'b1 | 5'b10010 | 5'b01100 | 1'b0 |
| 5'b00011 | 5'b10001 | 1'b1 | 5'b10011 | 5'b10001 | 1'b0 |
| 5'b00100 | 5'b10110 | 1'b1 | 5'b10100 | 5'b10110 | 1'b0 |
| 5'b00101 | 5'b11010 | 1'b1 | 5'b10101 | 5'b11010 | 1'b0 |
| 5'b00110 | 5'b11101 | 1'b1 | 5'b10110 | 5'b11101 | 1'b0 |
| 5'b00111 | 5'b11110 | 1'b1 | 5'b10111 | 5'b11110 | 1'b0 |
| 5'b01000 | 5'b11111 | 1'b1 | 5'b11000 | 5'b11111 | 1'b0 |
| 5'b01001 | 5'b11110 | 1'b1 | 5'b11001 | 5'b11110 | 1'b0 |
| 5'b01010 | 5'b11101 | 1'b1 | 5'b11010 | 5'b11101 | 1'b0 |
| 5'b01011 | 5'b11010 | 1'b1 | 5'b11011 | 5'b11010 | 1'b0 |
| 5'b01100 | 5'b10110 | 1'b1 | 5'b11100 | 5'b10110 | 1'b0 |
| 5'b01101 | 5'b10001 | 1'b1 | 5'b11101 | 5'b10001 | 1'b0 |
| 5'b01110 | 5'b01100 | 1'b1 | 5'b11110 | 5'b01100 | 1'b0 |
| 5'b01111 | 5'b00110 | 1'b1 | 5'b11111 | 5'b00110 | 1'b0 |

FIG. 11

| # | Thermometer Logic Input | Thermometer Logic Output* | # | Thermometer Logic Input | Thermometer Logic Output* |
|---|---|---|---|---|---|
| 1 | 5'b00000 | 31'h00000000 | 17 | 5'b10000 | 31'h0000FFFF |
| 2 | 5'b00001 | 31'h00000001 | 18 | 5'b10001 | 31'h0001FFFF |
| 3 | 5'b00010 | 31'h00000003 | 19 | 5'b10010 | 31'h0003FFFF |
| 4 | 5'b00011 | 31'h00000007 | 20 | 5'b10011 | 31'h0007FFFF |
| 5 | 5'b00100 | 31'h0000000F | 21 | 5'b10100 | 31'h000FFFFF |
| 6 | 5'b00101 | 31'h0000001F | 22 | 5'b10101 | 31'h001FFFFF |
| 7 | 5'b00110 | 31'h0000003F | 23 | 5'b10110 | 31'h003FFFFF |
| 8 | 5'b00111 | 31'h0000007F | 24 | 5'b10111 | 31'h007FFFFF |
| 9 | 5'b01000 | 31'h000000FF | 25 | 5'b11000 | 31'h00FFFFFF |
| 10 | 5'b01001 | 31'h000001FF | 26 | 5'b11001 | 31'h01FFFFFF |
| 11 | 5'b01010 | 31'h000003FF | 27 | 5'b11010 | 31'h03FFFFFF |
| 12 | 5'b01011 | 31'h000007FF | 28 | 5'b11011 | 31'h07FFFFFF |
| 13 | 5'b01100 | 31'h00000FFF | 29 | 5'b11100 | 31'h0FFFFFFF |
| 14 | 5'b01101 | 31'h00001FFF | 30 | 5'b11101 | 31'h1FFFFFFF |
| 15 | 5'b01110 | 31'h00003FFF | 31 | 5'b11110 | 31'h3FFFFFFF |
| 16 | 5'b01111 | 31'h00007FFF | 32 | 5'b11111 | 31'h7FFFFFFF |

FIG. 12

| Input | | Output | | | | | |
|---|---|---|---|---|---|---|---|
| oe | pol | ctl t | ctl sp A | ctl sn A | ctl sp B | ctl sn B |
| 0 | 0 | 1 | 0 | 0 | 0 | 0 |
| 0 | 1 | 1 | 0 | 0 | 0 | 0 |
| 1 | 0 | 0 | 1 | 0 | 0 | 1 |
| 1 | 1 | 0 | 0 | 1 | 1 | 0 |

FIG. 13

CIRCUITS FOR INTERMEDIATE-FREQUENCY-FILTERLESS, DOUBLE-CONVERSION RECEIVERS

CROSS-REFERENCE TO RELATED APPLICATIONS

This application claims the benefit of U.S. Provisional Patent Application No. 62/977,007, filed Feb. 14, 2020, and of U.S. Provisional Patent Application No. 63/130,070, filed Dec. 23, 2020, each of which is hereby incorporated by reference herein in its entirety.

BACKGROUND

The ever-increasing demands on wireless throughput require modern handset receivers to aggregate signals from multiple non-contiguously allocated RF carriers. Accordingly, new receivers that can receive signals from multiple non-contiguous RF carriers are desirable.

SUMMARY

In accordance with some embodiments, circuits for intermediate-frequency-filterless, double-conversion receivers are provided.

In some embodiments, circuits for a receiver are provided, the circuits comprising: M first mixers that each receive an input signal, that are each clocked by a different phase of a first common clock frequency, and that each provide an output, wherein M is a count of the first mixers; M sets of N second mixers, wherein N is a count of the second mixers in each of the M sets, wherein each second mixer in each set of N second mixers receives as an input the output of a corresponding one of the M first mixers, wherein each of the N second mixers in each of the M sets are clocked by a different phase of a second common clock frequency, and wherein each of the second mixers has an output; M harmonic rejection termination networks that each receive the outputs of the N second mixers in a corresponding one of the M sets, and that each provide an in-phase output and a quadrature-phase output; M in-phase trans-impedance amplifiers that each receive the in-phase output from a corresponding one of the M harmonic rejection termination networks and that each provide an in-phase baseband output signal; and M in-phase trans-impedance amplifiers that each receive the quadrature-phase output from a corresponding one of the M harmonic rejection termination networks and that each provide an quadrature-phase baseband output signal.

BRIEF DESCRIPTION OF THE DRAWINGS

FIG. 10 is an example of a table for sinusoidally modulating a transconductor of an in-phase branch of a receiver in accordance with some embodiments.

FIG. 11 is an example of a table for sinusoidally modulating a transconductor of a quadrature-phase branch of a receiver in accordance with some embodiments.

FIG. 12 is an example of a table for thermometer coding in accordance with some embodiments.

FIG. 13 is an example of a table for controlling transconductance unit cells in accordance with some embodiments.

DETAILED DESCRIPTION

In accordance with some embodiments, circuits for intermediate-frequency-(IF)-filter-less, double-conversion receivers for concurrent dual-carrier reception are provided.

Figure 1:
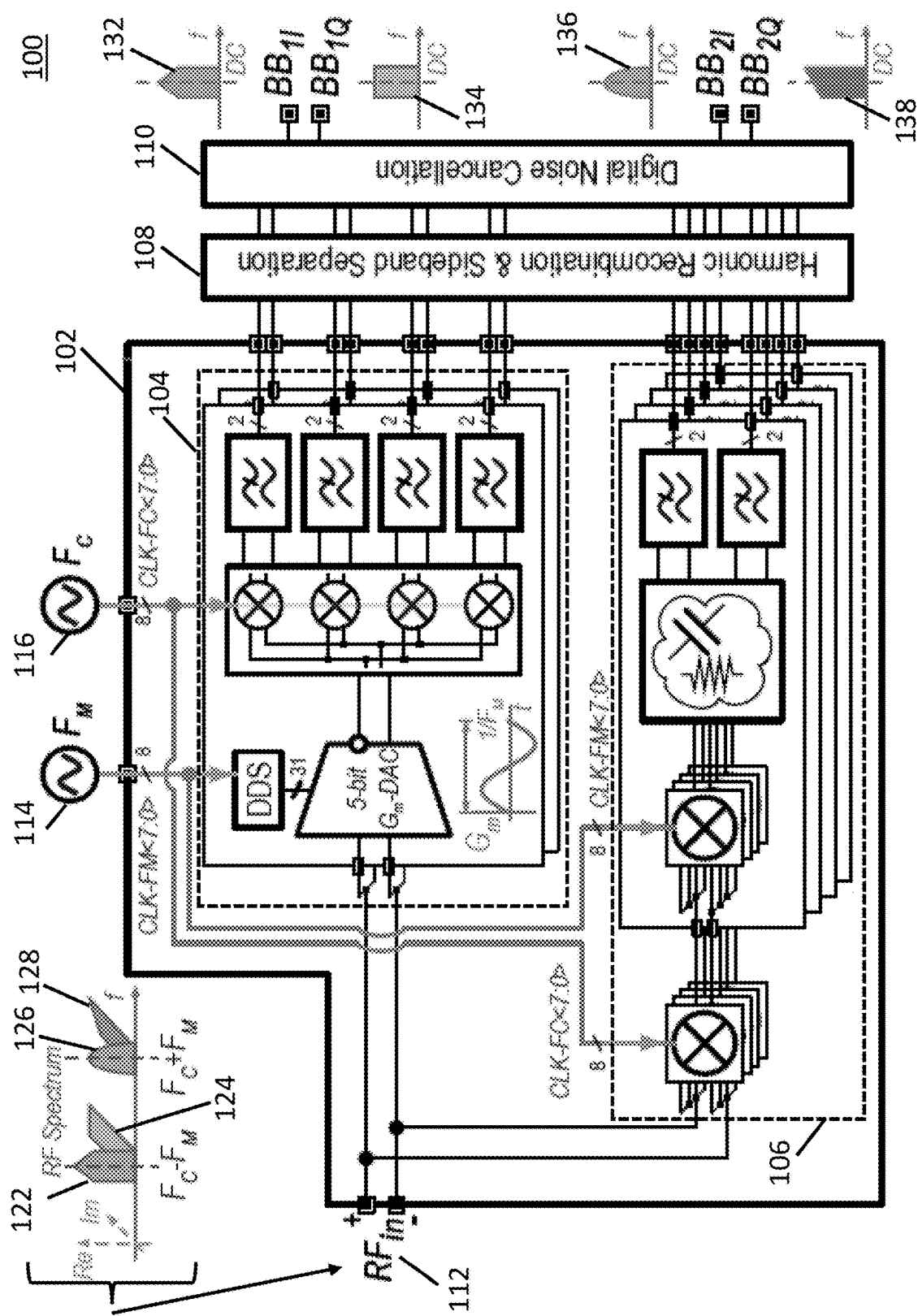
FIG. 1 is an example of a schematic of a receiver in accordance with some embodiments.

Turning to FIG. 1, in accordance with some embodiments, an example 100 of a schematic of a circuit for an intermediate-frequency-(IF)-filter-less, double-conversion receiver for concurrent dual-carrier reception is shown. As illustrated, circuit 100 includes a receiver front end 102 (which comprises two low-noise transconductance amplifier (LNTA) branches 104 and multiple double-conversion mixer-first branches 106), harmonic recombination and sideband separation circuitry 108, digital noise cancellation circuitry 110, a first clock source 114, and a second clock source 116.

In some embodiments, the circuit of FIG. 1 supports concurrent reception from two RF carriers have frequencies in a range from 100 MHz to 1200 MHz and separated apart by 200 MHz to 600 MHz.

In some embodiments, during operation in some modes, double-conversion mixer-first branches 106 translate a low-pass baseband impedance twice: first to a frequency $F_M$; and then to a frequency $(F_C+/-F_M)$. In some embodiments, doing this provides concurrent narrow-band impedance matching at two distinct frequencies only, while reflecting out-of-band signals for good linearity.

In some embodiments, LNTA branches 104 use direct digital synthesis (DDS)-modulated LNTAs for multi-phase, switched-transconductance mixing at $F_M$, and standard 8-phase mixing at $F_C$ with harmonic rejection (HR) baseband circuits.

In some embodiments, two RF carriers at $(F_C+/-F_M)$ can be received, while spurious responses at $(m \cdot F_C+/-n \cdot F_M)$ can be reduced for $m<(M-1)$ (e.g., 7) and $n<(N-1)$ (e.g., 15) with M-phase (e.g., 8-phase) $F_C$ and N-phase (e.g., 16 phase) $F_M$ clocks, where M and N are integers and powers of 2.

If some embodiments, this architecture can be extended to more clock phases to suppress more harmonics, subject to the process technology supporting the necessary clock speeds. For example, compared to 6 nm CMOS, a better process node (i.e., CMOS processes with smaller transistor feature lengths) (e.g., in 28 nm CMOS) usually offers a better logic gate for smaller gate delay and faster edge transition. Thus, in some embodiments, if one were to use 28 nm CMOS process, the DDS circuits can operate at a significantly higher clock speed to support more DDS clock phases.

As shown in FIG. 1, signals received at $RF_{in}$ 112 can include real and imaginary components 122 and 124, respectively, at $F_C-F_M$ and real and imaginary components 126 and 128, respectively, at ($F_C+F_M$). In response to these signals, circuit 100 can produce components 132, 134, 136, and 138 at the outputs of digital noise cancellation circuitry 110.

Although circuit 100 is shown in FIG. 1 as being implemented in a differential manner, it should be understood that circuit 100 can be implemented in a single-ended manner in some embodiments.

Figure 2:
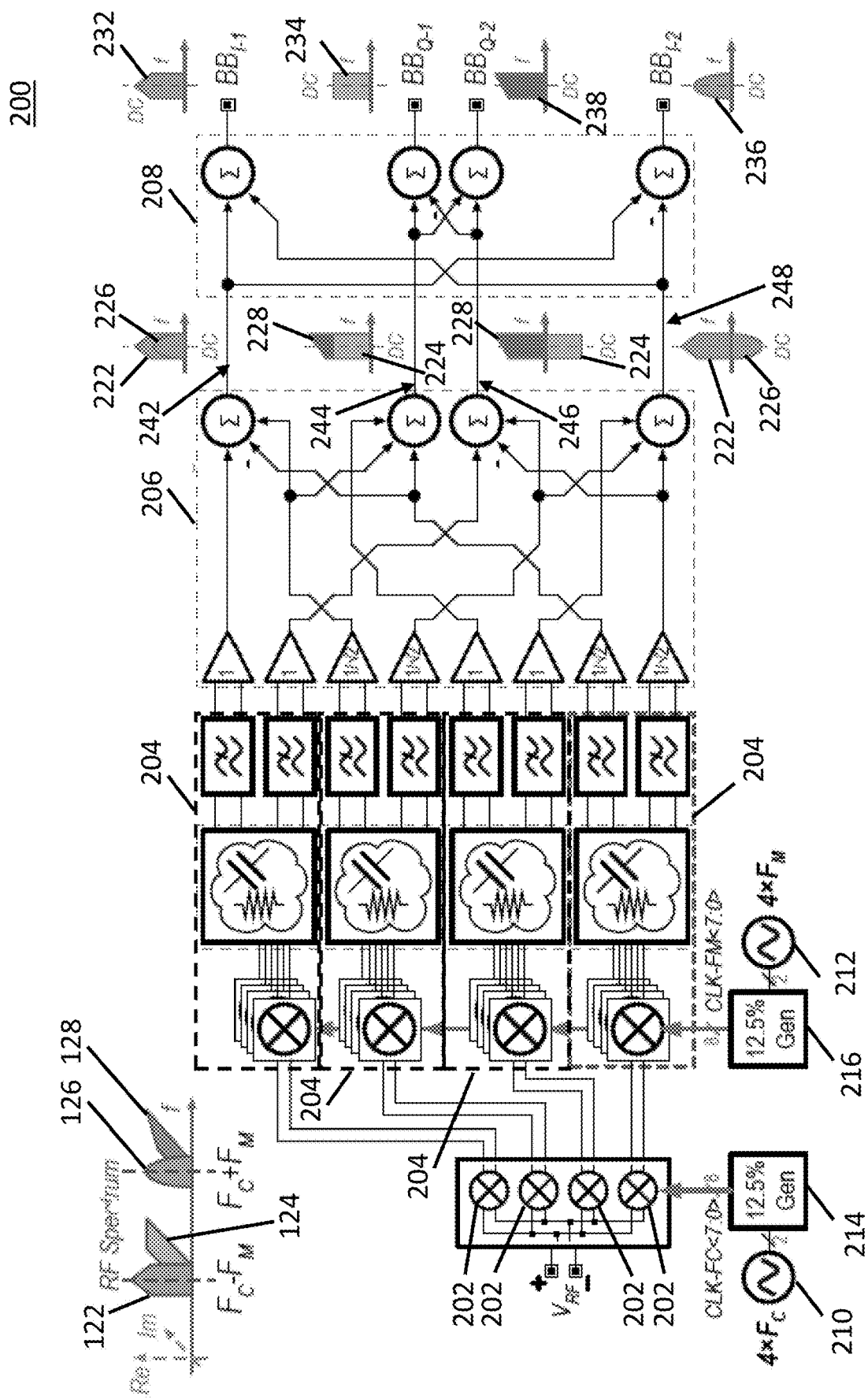
FIG. 2 is an example of a schematic of a mixer-first branch of a receiver in accordance with some embodiments.

Turning to FIG. 2, an example 200 of a schematic of a circuit that can be used to implement four double-conversion mixer-first branches (MFBs) 106 and portions of circuitry 108 in accordance with some embodiments is shown. In some embodiments, circuit 200 creates an RF interface with tuned impedance matching at ($F_C+/-F_M$).

As illustrated, circuit 200 includes four first layer mixers 202, four second layer circuits 204, harmonic recombination circuits 206, sideband separation circuits 208, first clock source 210, second clock source 212, first 12.5% duty cycle clock generator 214, and second 12.5% duty cycle clock generator 216.

In some embodiments, RF signals around ($F_C+/-F_M$) are received at VR, down-converted to $F_M$, and then further down-converted to baseband without IF filtering. The eight baseband outputs from second layer circuits 204 are harmonically combined into four linearly independent outputs 242, 244, 246, and 248, while rejecting higher-order $F_C$ harmonics. Addition and subtraction circuits then extract the I/Q components from each RF carrier to provide signals $BB_{I-1}$, $BB_{Q-1}$, $BB_{Q-2}$, and $BB_{I-2}$.

As described above in connection with FIG. 1, signals in VR received at mixers 202 can include real and imaginary components 122 and 124, respectively, at $F_C-F_M$ and real and imaginary components 126 and 128, respectively, at $F_C+F_M$. In response to these signals, circuitry 206 can produce components 222 and 226 (corresponding to components 122 and 126, respectively) at 242, components 224 and 228 (corresponding to components 124 and 128, respectively) at 244, components 224 and 228 (corresponding to components 124 and 128, respectively) at 246, and components 222 and 226 (corresponding to components 122 and 126, respectively) at 248. Components 232, 234, 238, and 236 can then provided at outputs $BB_{I-1}$, $BB_{Q-1}$, $BB_{Q-2}$, and $BB_{I-2}$, respectively.

In some embodiments, mixers 202 can be implemented in any suitable manner. For example, in some embodiments mixers 202 can be implemented using RF switches. In some embodiments, each RF switch can be realized as a custom-designed LVT RF NMOS transistor, placed in a deep N-well with the body terminal floating to ground.

In some embodiments, a switch width of 100 μm can be used for both the first-layer mixers (mixers 202) and the second-layer mixers (mixers 302 (see below)). In some embodiments, an alternate way to size the switches of mixers 202 and 302 is to use small-size switches for the $F_C$ clock (mixers 202) and large-size switches for the $F_M$ clock (mixers 302), such that the sum of the two switch resistances stays the same.

In some embodiments, each of first layer mixers 202 is clocked by a unique pair of phases (e.g.: phases 0 and 4; phases 1 and 5; phases 2 and 6; or phases 3 and 7) of an eight (0 ... 7) phase, 12.5% duty cycle, non-overlapping clock at a frequency $F_C$.

Although circuit 200 is shown in FIG. 2 as being implemented in a differential manner, it should be understood that circuit 200 can be implemented in a single-ended manner in some embodiments.

Figure 3:
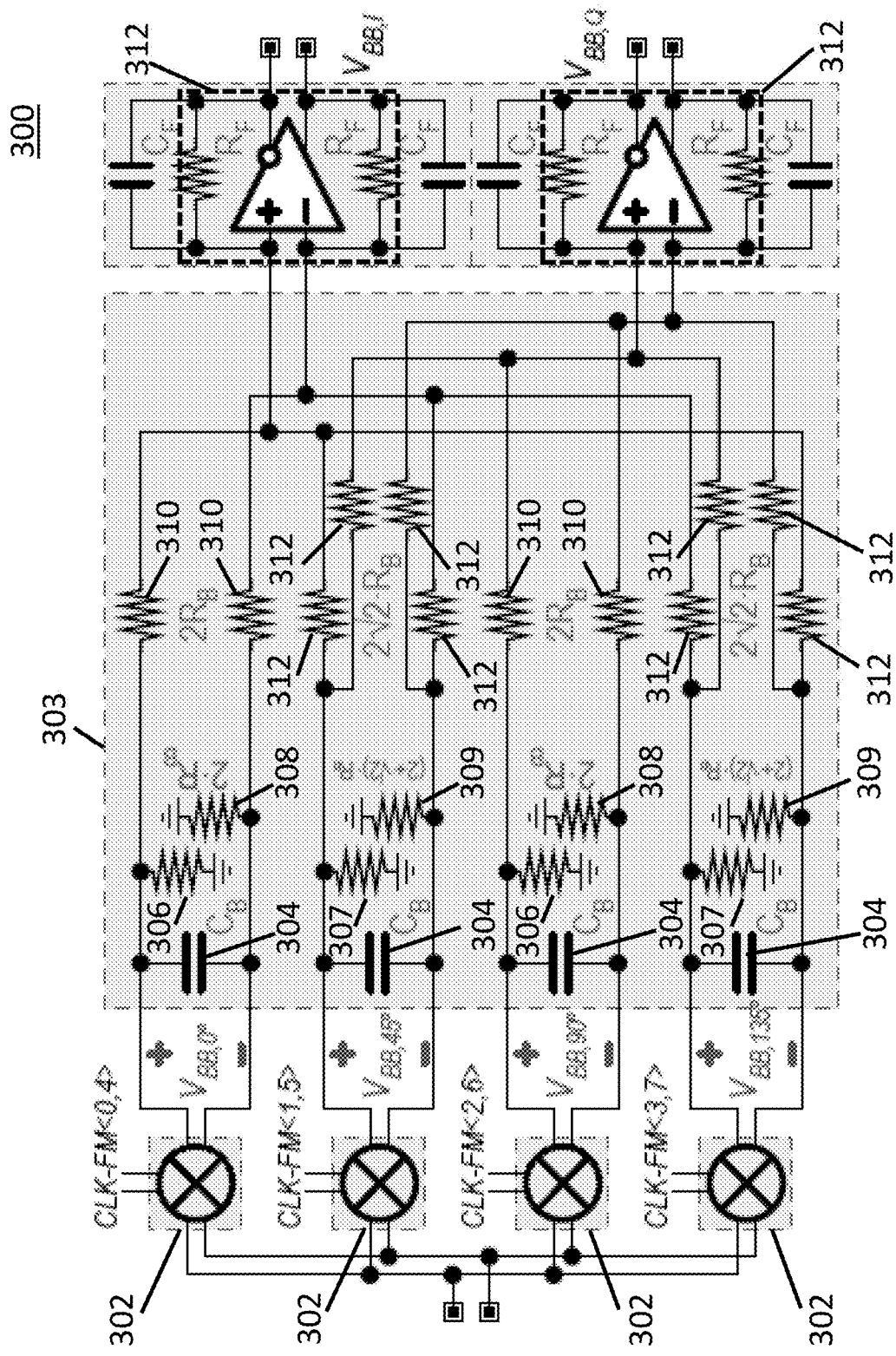
FIG. 3 is an example of a schematic of second layer circuitry of a mixer-first branch of a receiver in accordance with some embodiments.

Turning to FIG. 3, an example 300 of a schematic of a circuit that can be used to implement each second layer circuit 204 of FIG. 2 in accordance with some embodiments is shown. As illustrated, circuit 300 includes four differential passive mixers 302 (each of which is connected to two of eight $F_M$ clock phases as shown in the figure), a passive HR termination network 303, two differential transimpedance amplifiers (TIAs) 312, and four feedback capacitors $C_F$.

Although circuit 300 is shown in FIG. 3 as being implemented in a differential manner, it should be understood that circuit 300 can be implemented in a single-ended manner in some embodiments.

In some embodiments, mixers 302 can be implemented in any suitable manner. For example, in some embodiments mixers 302 can be implemented using switches which can be custom-design LVT RF NMOS transistors, placed in a deep N-well with body terminals floating to ground.

In some embodiments, passive HR termination network 303 includes baseband capacitors $C_B$ 304, and resistors 306, 307, 308, 309, 310, and 312. In some embodiments, resistors 306 and 308 can have values of $2*R_B$, resistors 307 and 309 can have values of $(2+\sqrt{2})*R_B$, resistors 310 can have values of $2*R_B$, and resistors 312 can have values of $2*\sqrt{2}*R_B$, where $R_B$ is any suitable value as described below. In some embodiments, $C_B$ can have a value of 10 pF, $C_F$ can have a value of 3.5 pF (for single-carrier reception) or 0.89 pF (for dual-carrier reception), and RF can have a value of 4.5Ω (for single-carrier reception) or 18Ω (for dual-carrier reception).

In some embodiments, during operation, passive HR termination network 303 combines the down-converted signals with sinusoidal weighting in currents, while maintaining a constant resistance seen by the baseband capacitors $C_B$. It rejects 3rd and 5th $F_M$ harmonics at the input of baseband TIAs 312 and offers a tuned impedance matching at $F_M$. By providing circuit 300 as the termination of each first-layer mixer 202, which uses a pair of an 8-phase differential passive mixers clocked at $F_C$, the tuned RF interface is then translated to ($F_C+/-F_M$). The narrow-bandpass tuned impedance matching at ($F_C+/-F_M$) reflects the out-of-band blocker signals, thus enhancing the out-of-band linearity of LNTA branches 104 significantly.

Figure 4:
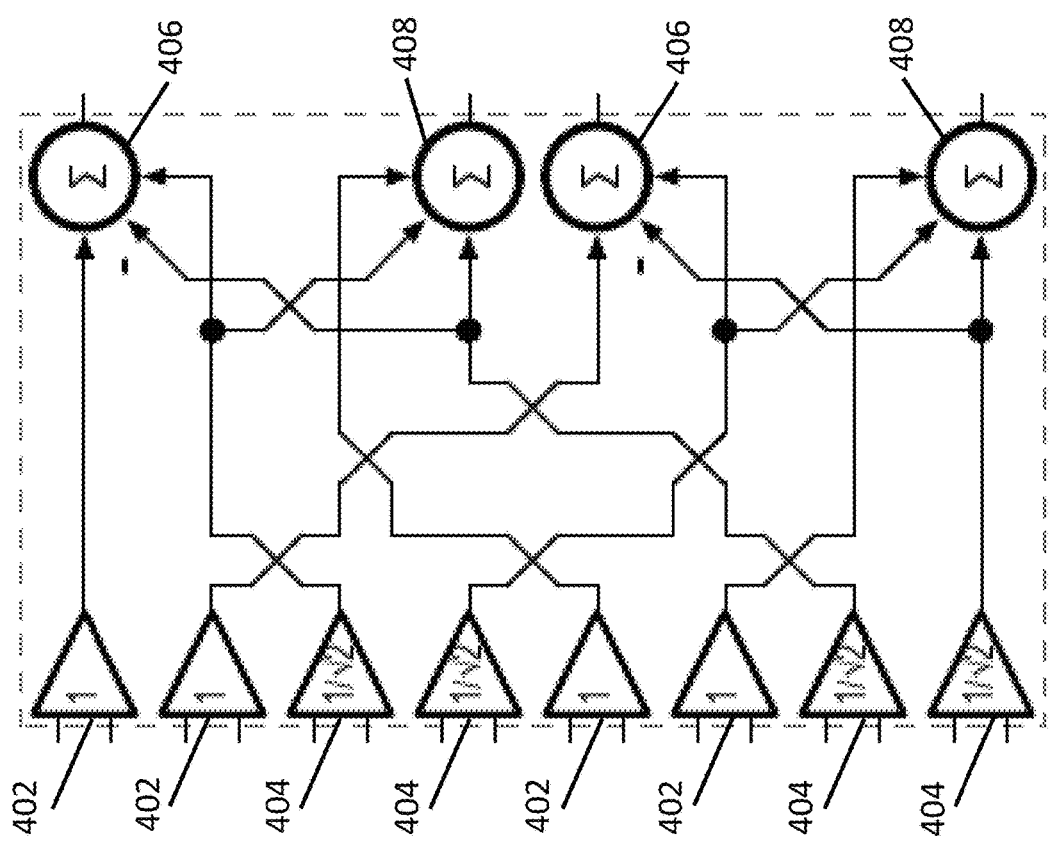
FIG. 4 is an example of a schematic of harmonic recombination circuitry of a receiver in accordance with some embodiments.

Turning to FIG. 4, components of harmonic recombination circuitry 206 are shown in accordance with some embodiments. As illustrated, circuitry 206 includes amplifiers 402 and 404, subtracters 406, and adders 408 in some embodiments. Any suitable amplifiers can be used to implement amplifiers 402 and 404, and amplifiers 402 and 404 can have gains of one and $1/\sqrt{2}$, respectively, in some embodiments. Any suitable subtracters and adders can be used to implement subtracters 406 and adders 408, respectively, in some embodiments.

Figure 5:
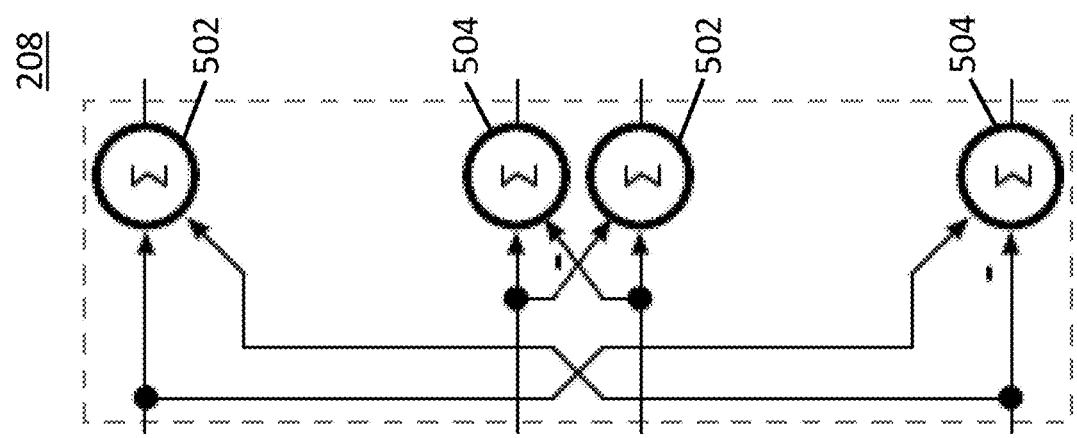
FIG. 5 is an example of a schematic of sideband separation circuitry of a receiver in accordance with some embodiments.

Turning to FIG. 5, components of sideband separation circuitry 208 are shown in accordance with some embodiments. As illustrated, circuitry 208 includes adders 502 and subtracters 504 in some embodiments. Any suitable adders and subtracters can be used to implement adders 502 and subtracters 504, respectively, in some embodiments.

As described further below, in some embodiments, circuit 100 can be configured to operate in a variety of modes. For example, in some embodiments, circuit 100 can be configured for single-carrier reception or for concurrent, double-carrier reception.

In some embodiments, when the circuit of FIG. 1 is performing single-carrier reception, first-layer mixers 202 can be bypassed using any suitable circuitry (e.g., switches (not shown)), and second-layer mixers 302 can be clocked at $F_C$ instead of at $F_M$. In some such embodiments, four sets of second layer circuits 204 can be operated in parallel to help reduce the switch and routing resistance and improve the out-of-band $S_{11}$ reflection for better linearity, but at the cost of a dynamic power penalty. Alternatively, in some such embodiments, all but one second layer circuit can be turned off.

In some embodiments, when the circuit of FIG. 1 is performing concurrent, dual-carrier reception, the double-conversion mixer-first branches can be treated as two 8-path filters connected in series and terminated with low-pass, baseband impedances. These double-conversion mixer-first branches can be implemented in a fully single-ended, a single-ended-differential, or a fully differential realization.

In some embodiments, when the circuit of FIG. 1 is operating for single-carrier reception as described above and in a single-ended realization, its RF input impedance can be represented by:

$$Z_{in}(\omega) = \frac{1}{4} \cdot \left\{ 2R_{SW} + 8 \cdot \sum_{m=-\infty}^{+\infty} |\alpha_m|^2 \cdot Z_{BB}(\omega - m \cdot \omega_C) \right\} \quad (1)$$

$$= \frac{R_{SW}}{2} + 2 \cdot \sum_{m=-\infty}^{+\infty} |\alpha_m|^2 \cdot Z_{BB}(\omega - m \cdot \omega_C)$$

where $Z_{BB}(\omega)$ is the loading impedance, $R_{SW}$ is the passive mixer switch resistance, m is any integer, $|\alpha_m|=|\text{sinc}(m\pi/8)/8|$, and $\omega_C$ is $2\pi F_C$. For a source impedance of 50Ω and ideal mixer switches (i.e., $R_{SW}=0$), $R_B$ needs to be 1.68Ω for impedance matching.

Similarly, in some embodiments, when the circuit of FIG. 1 is operating for single-carrier reception as described above and in a differential realization, its RF input impedance can be represented by:

$$Z_{in}(\omega) = \frac{1}{4} \cdot \left\{ 4R_{SW} + 8 \cdot \sum_{m=-\infty}^{+\infty} |2\alpha_m|^2 \cdot Z_{BB}(\omega - m \cdot \omega_C) \right\} \quad (2)$$

$$= R_{SW} + 2 \cdot \sum_{m=-\infty}^{+\infty} |2\alpha_m|^2 \cdot Z_{BB}(\omega - m \cdot \omega_C)$$

where m is an odd integer. For a source impedance of 100Ω and ideal mixer switches, $R_B$ needs to be 0.84Ω for impedance matching.

In some embodiments, when the circuit of FIG. 1 is operating for dual-carrier reception and in a fully single-ended double-conversion mixer-first branch, its RF input impedance can be represented as follows:

$$Z_{in}(\omega) = 2R_{SW} + 8^2 \cdot \sum_{m=-\infty}^{+\infty}\sum_{n=-\infty}^{+\infty} |\alpha_m|^2 \cdot |\alpha_n|^2 \cdot Z_{BB}[\omega - (m \cdot \omega_C + n \cdot \omega_M)] \quad (3)$$

where m, n are any integers, $|\alpha_n|=|\text{sinc}(n\pi/8)/8|$, $\omega_C$ is $2\pi F_C$, and $\omega_M$ is $2\pi F_M$. The input impedance is then twice the switch resistance in series with the scaled, frequency-translated baseband impedance at $(m \cdot F_C + n \cdot F_M)$. For ideal mixer switches (i.e., $R_{SW}=0$), $R_B$ needs to be 3.53Ω for impedance matching.

In some embodiments, the profiles have spurious matching at $(m \cdot F_C + n \cdot F_M)$ where m and n are any integers. To reduce the spurious matching, the second-layer passive mixers can be realized differentially, given that the first-layer passive mixers produce differential outputs. The RF input impedance can thus be represented by:

$$Z_{in}(\omega) = 2R_{SW} + \frac{8^2}{2} \cdot \sum_{m=-\infty}^{+\infty}\sum_{n=-\infty}^{+\infty} |\alpha_m|^2 \cdot |\alpha_n|^2 \cdot \left[1 + e^{-j \cdot (m+n) \cdot \pi}\right]^2 \cdot Z_{BB}[\omega - (m \cdot \omega_C + n \cdot \omega_M)]. \quad (4)$$

where m and n are any integers. Impedance matching now occurs at $(m \cdot F_C + n \cdot F_M)$, where $(m+n)$ is even. For ideal mixer switches, $R_B$ needs to be 1.76Ω for impedance matching.

With a differential realization of both the first-layer mixers and the second-layer mixers, the unwanted responses get suppressed for even m and n. The RF input impedance can thus be represented by:

$$Z_{in}(\omega) = 4R_{SW} + \frac{8^2}{2} \cdot \sum_{m=-\infty}^{+\infty}\sum_{n=-\infty}^{+\infty} |2\alpha_m|^2 |2\alpha_n|^2 \cdot Z_{BB}[\omega - (m \cdot \omega_C + n \cdot \omega_M)] \quad (5)$$

where m, n are both odd integers. For ideal mixer switches, $R_B$ needs to be 0.88Ω for impedance matching, hence the $R_B$ values for both single-carrier and concurrent dual-carrier reception are the same to the first order.

Figure 6:
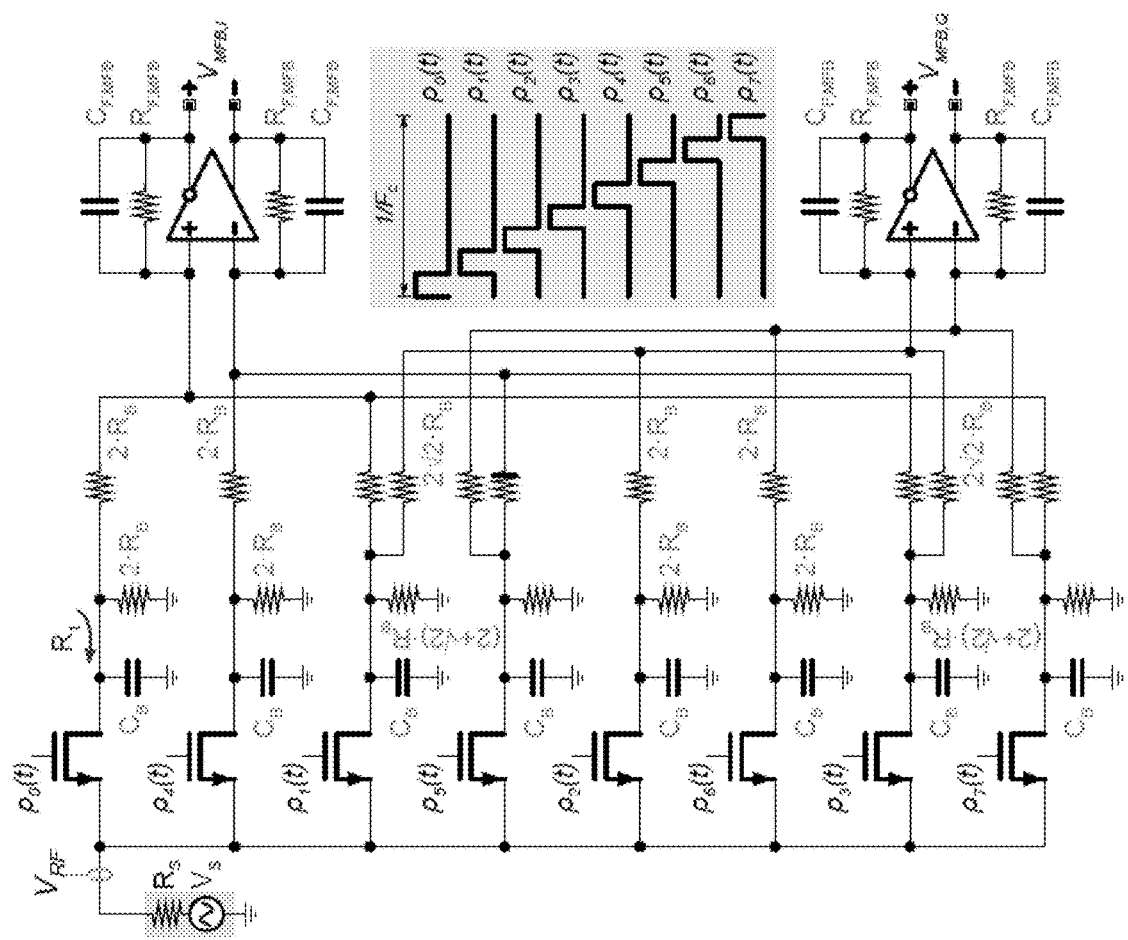
FIG. 6 is an example of a schematic of a single-ended mixer first branch of a receiver in accordance with some embodiments.

In some embodiments in which single-carrier reception is being performed as described above, the first-layer passive mixers are bypassed, and the four sets of second-layer mixers are operated in parallel and clocked at $F_C$. In this case, the total switch resistance will be reduced by a factor of four. In some embodiments, FIG. 6 can be used to study gain and noise performance of this configuration. In some embodiments, the circuit of FIG. 6 performs the harmonic recombination at the baseband TIA inputs. The conversion gain can be derived as:

$$CG_{MFB,SNGL} \equiv \frac{V_{MFB,I}}{V_{RF}} = \frac{G_{MXR} \cdot R_{F,MFB}}{R_{SW} + \eta R_B} = \frac{1}{4} \cdot \frac{R_{F,MFB}}{R_{SW} + \eta R_B} \cdot \text{sinc}(\pi/8) \quad (6)$$

where $G_{MXR}=\text{sinc}(\pi/8)/4$ is the passive mixer current conversion gain, $R_{F,MFB}$ is the TIA feedback resistance, and $\eta=8 \cdot |\alpha_1|^2$ is the impedance translation coefficient.

The noise factor of this configuration can be represented by:

$$F \approx \frac{1}{\text{sinc}^2(\pi/8)} \cdot \left\{ 1 + \frac{R_{SW}}{R_S} + \frac{R_B}{8R_S} \cdot \left[1 + \sqrt{2} \cdot \left(\frac{R_1 + R_B}{R_B}\right)^2\right] + \frac{\gamma}{G_{m,op}R_S} \cdot \left[\frac{1}{4} + \frac{R_1 + R_B}{2} \cdot \left(\frac{\sqrt{2}}{2} \cdot \frac{1}{R_B} + \frac{1}{R_{F,MFB}}\right)\right]^2 \right\}. \quad (7)$$

For $R_S=50\Omega$, $R_{SW}=2.5\Omega$, $R_B=399.2\Omega$, $\gamma=1$ (for 65 nm CMOS process), $G_{m,op}=3$ mS, $R_1=(R_S+R_{SW})$, and $R_{F,MFB}=4.5\Omega$, the NF is calculated as 12.2 dB, whereas a simulated NF using schematic-level behavioral models can be calculated as 12.4 dB. The 0.2 dB difference probably stems from the power loss.

In some embodiments, a single-ended-differential realization yields the same performance as that of a fully differential realization. Thus, in some embodiments, the conversion gain from the RF input to the sideband-separated output for fully differential realization can be represented by:

$$CG_{MFB,DUAL} = \frac{1}{2R_{SW}+2\eta^2 \cdot R_B} \cdot G_{MXR}^2 R_{F,MFB} \cdot 2 \cdot 2 \quad (8)$$
$$= \frac{1}{4} \cdot \frac{R_{F,MFB}}{2R_{SW}+2\eta^2 \cdot R_B} \cdot \text{sinc}^2(\pi/8)$$

where $2\eta^2$ is the impedance translation coefficient of the single-ended-differential configuration in equation (4). The first factor of '2' stems from the harmonically recombining gain for the $F_C$ clocks, and the second factor of '2' is the sideband separation gain. Under the impedance matching condition (i.e., $2R_{SW}+2\eta^2 \cdot R_B=R_S$), equation (8) reduces to:

$$CG_{MFB,DUAL} = \frac{1}{4} \cdot \frac{R_{F,MFB}}{R_S} \cdot \text{sinc}^2(\pi/8) \quad (9)$$

Following the same logic and procedures, the noise factor can be represented by:

$$F \approx \frac{1}{\text{sinc}^4(\pi/8)} \cdot \left\{ 1 + \frac{2R_{SW}}{R_S} + \frac{R_B}{(8^2/2) \cdot R_S} \cdot \left[ 1 + \sqrt{2} \cdot \left(\frac{R_1+R_B}{R_B}\right)^2 \right] + \right.$$
$$\left. \frac{\gamma}{G_{m,op}R_S} \cdot \frac{1}{4} \cdot \left[ \frac{1}{4} + \frac{R_1+R_B}{2} \cdot \left( \frac{\sqrt{2}}{2} \cdot \frac{1}{R_B} + \frac{1}{R_{F,MFB}} \right) \right]^2 \right\} \quad (10)$$

where $R_1$ now is $(8^2/2) \cdot (R_S+2R_{SW})$. For $R_S=50\Omega$, $2R_{SW}=10\Omega$, $R_B=1412\Omega$, $\gamma=1$, $G_{m,op}=750$ uS, and $R_{F,MFB}=18\Omega$, the NF is calculated as 13.1 dB, whereas the simulated NF is 13.6 dB. The 0.5 dB difference probably stems from the power loss.

In some embodiments, due to the time-varying nature and the transparency of the passive mixers in the first and second layers, the mixer-first branches may exhibit harmonic folding and down-conversion. While undesired signals at clock harmonics are down-converted, a differential N-path realization as described herein in accordance with some embodiments can help to suppress the responses at the even clock harmonics. In some embodiments, the HR termination networks described herein combine the down-converted signals in current with sinusoidal weights to reject the responses at the odd clock harmonics, up to the 5th harmonic. Undesired signals at clock harmonics can fold to the desired signal band. The harmonic folding rejection ratio (HFRR), which is the ratio of the gain of the wanted RF signals to the gain of the unwanted RF signals that fold back to the desired signal band, can be represented by:

$$HFRR_{(m,n)} = \left| \frac{\text{sinc}^2(\pi/8)}{\text{sinc}(m\pi/8)\text{sinc}(n\pi/8)} \right| \quad (11)$$

where $m=8k_1\pm1$, $n=8k_2\pm1$, and $k_1, k_2 \in Z$. In some embodiments, increasing the number of clock phases, especially for the $F_M$ clocks, can be used to mitigate the harmonic folding, however, at the cost of reducing the maximum RF operating frequency and increasing the dynamic switch power. In some embodiments, 8 phases can be used for both $F_C$ and $F_M$ clocks for the double-conversion mixer-first branches.

Double-conversion LNTA branches are incorporated into the circuit of FIG. 1 to perform noise cancellation with the mixer-first branches for better receiver sensitivity.

Figure 7:
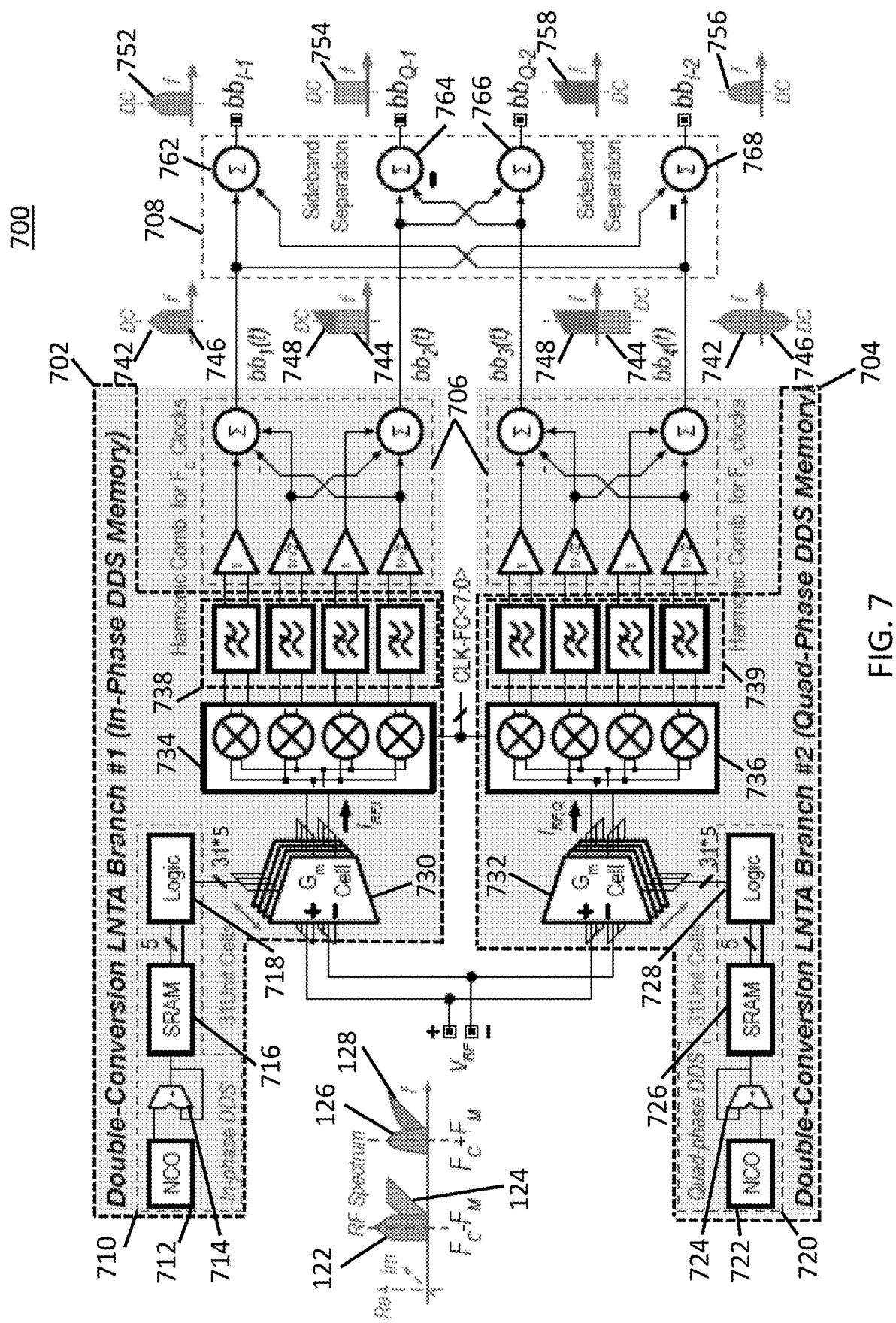
FIG. 7 is an example of a schematic of a two dual-conversion low noise transconductance amplifier branches of a receiver in accordance with some embodiments.

Turning to FIG. 7, an example 700 of a schematic of circuitry that can be used to implement LNTA branches 104 and part of circuitry 108 of FIG. 1 in accordance with some embodiments is illustrated.

As shown, circuitry 700 includes LNTA branches 702 and 704, harmonic combination circuits 706 and sideband separation circuits 708.

As described above in connection with FIG. 1, signals in $V_{RF}$ can include real and imaginary components 122 and 124, respectively, at $F_C-F_M$ and real and imaginary components 126 and 128, respectively, at $F_C+F_M$. In response to these signals, circuits 706 can produce components 742 and 746 (corresponding to components 122 and 126, respectively) at $bb_{1(t)}$, components 744 and 748 (corresponding to components 124 and 128, respectively) at $bb_{2(t)}$, components 744 and 748 (corresponding to components 124 and 128, respectively) at $bb_{3(t)}$, and components 742 and 746 (corresponding to components 122 and 126, respectively) at $bb_{4(t)}$. Components 752, 754, 758, and 756 can then be provided at outputs $bb_{I-1}$, $bb_{Q-1}$, $bb_{Q-2}$, and $bb_{I-2}$, respectively.

In some embodiments, to support concurrent signal reception, the LNTA branches combine conventional low-noise receiver design with direct digital synthesis (DDS) modulation.

In some embodiments, each LNTA can be include DDS circuits 710/720, 31 (or any other suitable number) transconductor unit slices 730/732, mixers 734/736, and filters 738/739. Any suitable transconductor unit slices can be used to implement slices 730/732 in some embodiments. In some embodiments, mixers 734/736 can be implemented similarly to mixers 202 of FIG. 2, as described above. Filters 738/739 can be implemented in any suitable manner, such as using TIAs with feedback capacitors similarly to what is illustrated in FIG. 3, in some embodiments.

Each DDS circuit 710/720 comprises a numerically controlled oscillator (NCO) 712/722, a phase accumulator 714/724, a 32-depth (or any other suitable size) memory 716/726, and a logic decoder 718/728.

Each NCO 712/722 can provide a clock output at a frequency (e.g., for 8-phase DDS modulation, the NCO can provide a clock frequency of $8*F_M$, and for 16-phase DDS modulation, the NCO can provide a clock frequency of $16*F_M$) set by a hardware processor or any other suitable control mechanism (not shown).

Each phase accumulator 714/724 can accumulate a count based on the output of the corresponding NCO and a control input (not shown) that controls the rate (e.g., 1×, 2×, 4×, 8×, etc.) at which the accumulator increments its count (e.g., for 8-phase DDS modulation, the accumulator can have an increment of 4, and for 16-phase DDS modulation, the accumulator can have an increment of 2).

Each memory 716/726 can include a look-up table that contains data for sinusoidally modulating the transconductor unit slices. In some embodiments, this table can be created as shown in FIG. 10 (for in-phase) or FIG. 11 (for quadrature-phase). As shown, the tables can receive a 5-bit (or any other suitable size) input and provide a 5-bit (or any other suitable size) magnitude ("MAG") output and a polarity ("POL") bit.

Each logic decoder 718/728 can include a thermometer encoding table (e.g., such as the table of FIG. 12) for converting the 5-bit magnitude output by the corresponding memory 716/726 into a 31-bit (or any other suitable size) thermometer encoded output. Each logic decoder 718/728 can also include 31 (or any other suitable number) transconductor unit cell control tables (an example of which is shown in FIG. 13). Each bit of the thermometer encoded output can the drive its own transconductor unit cell control table. The bit of the thermometer encoded output can be used as an output enable ("oe") input along with the corresponding polarity bit ("pol") to drive the transconductor unit cell control table. As illustrated, in response to the input signals "oe" (output enable) and "pol" (polarity), each transconductor unit cell control table can provide five output signals ctl_t, ctl_sp_A, ctl_sn_A, ctl_sp_B, and ctl_sn_B, which can be used to control transmission gates 812 in FIG. 8 as shown of a corresponding transconductor unit cell.

In this way, during operation, transconductance unit cells 730/732 can be sinusoidally modulated at $F_M$ by DDS circuits 710 and 720, in some embodiments.

Each LNTA branch operates as a multi-phase, switched-transconductance mixer to translate signals from ($F_C \pm F_M$) to $F_C$ in some embodiments. In some embodiments, to reject 3rd and 5th $F_M$ harmonics, the DDS phase accumulator increment can be set to 4 and the DDS circuits can be clocked at 8·$F_M$. In some embodiments, to additionally reject 7th and 9th $F_M$ harmonics, the DDS phase accumulator increment can be set to 2 and the DDS circuits can be clocked at 16·$F_M$.

In some embodiments, the RF currents at the outputs of the transconductor unit cells ($I_{RF,I}$ and $I_{RF,Q}$ in FIG. 7) are translated from $F_C$ to baseband using passive mixers driven by 8-phase 12.5%-duty-cycle, non-overlapping clocks at $F_C$. The outputs of the four baseband TIAs are harmonically combined by circuits 706 to reject 3rd and 5th $F_C$ harmonics.

The two LNTA branches, when modulated with in-phase and quadrature-phase sinusoidal DDSs 710 and 720, respectively, generate four outputs, $bb_1(t)$, $bb_2(t)$, $bb_3(t)$, $bb_4(t)$, at the output of harmonic recombination circuits 706 that contain overlapping but linearly independent I/Q components from the two RF carriers at ($F_C \pm F_M$). The I/Q components of each RF carrier are extracted using baseband addition and subtraction circuits 762, 764, 766, and 768 in sideband separation circuits 708. For example, by summing the outputs $bb_1(t)$ and $bb_4(t)$ with addition circuit 762, the in-phase component $bb_{I-1}$ from the lower RF carrier is obtained.

The components of circuits 706 and 708 can be implemented in the same manner as corresponding components in FIGS. 4 and 5 as described above.

In some embodiments, for single-carrier reception, one LNTA branch can be disabled, and the DDS controls in the other LNTA branch can be fixed, so that the receiver operates as an 8-phase harmonic rejection (HR) receiver.

The conversion gain of each LNTA branch from RF input to baseband output when operating in a dual-carrier reception mode can be represented by:

$$CG_{LB,DUAL} = \frac{1}{2} \cdot G_{m,pk} R_{F,LB} \cdot \text{sinc}\left(\frac{\pi}{N}\right) \cdot \text{sinc}\left(\frac{\pi}{8}\right) \quad (12)$$

where N is the number of DDS modulation phases, $G_{m,pk}$ is the peak LNTA transconductance, and $R_{F,LB}$ is the TIA feedback resistance.

For single-carrier operation, the branch operates as an 8-phase HR receiver with a conversion gain given by:

$$CG_{LB,SNGL} = \frac{1}{2} \cdot G_{m,pk} R_{F,LB} \cdot \text{sinc}\left(\frac{\pi}{8}\right) \quad (13)$$

which is very close to equation (12) except for the sinc($\pi$/N) multiplication factor. In some embodiments, the conversion gains for both modes are very close; for 8-phase modulation, the conversion gain in the dual-carrier reception mode is only 0.2 dB lower than the gain for single-carrier reception, while for 16-phase modulation, the conversion gain is only 0.1 dB lower.

The noise factor of the DDS-modulated LNTA branch with 8-phase modulation at $F_M$ and 8-phase HR mixing at $F_C$ can be represented by:

$$F_{LB} = \frac{1}{\text{sinc}^4(\pi/8)} \cdot \left\{2 + \frac{2\gamma}{G_{m,pk} R_S} \cdot \left[1 + 2\cos\left(\frac{\pi}{4}\right)\right]\right\} \quad (14)$$

where the first term of '2' is due to the noise of $R_S$ (the source resistance) and $R_T$ (the termination resistance).

The noise factor with 16-phase DDS modulation at $F_M$ and 8-phase HR mixing at $F_C$ can be represented by:

$$F_{LB} = \frac{1}{\text{sinc}^2(\pi/8) \cdot \text{sinc}^2(\pi/16)} \cdot \quad (15)$$

$$\left\{2 + \frac{2\gamma}{G_{m,pk} R_S} \cdot \left[\frac{1}{2} + \cos\left(\frac{\pi}{8}\right) + \cos\left(\frac{\pi}{4}\right) + \cos\left(\frac{3\pi}{8}\right)\right]\right\}.$$

For the double-conversion LNTA branches, the harmonic rejection happens in both the $F_C$ and $F_M$ clock domains. To the first order, the harmonic rejection ratio (HRR) is obtained by multiplying two HRR expressions; e.g., when using 8-phase DDS modulation and 8-phase $F_C$ clocks, the HRR at the sideband-separated outputs of the double-conversion LNTA branches at (m·$F_C$+n·$F_M$) is:

$$HRR_{(m,n)} = \quad (16)$$

$$\frac{\text{sinc}(\pi/8)}{\text{sinc}(m\pi/8)} \cdot \frac{\text{sinc}(\pi/8)}{\text{sinc}(n\pi/8)} \cdot \frac{1 + \rho_c \cdot 2\cos(\pi/4)}{1 + \rho_c \cdot 2\cos(m\pi/4)} \cdot \frac{1 + \rho_m \cdot 2\cos(\pi/4)}{1 + \rho_m \cdot 2\cos(n\pi/4)}$$

where m, n are both odd integers, $\rho_m$ is the ratio of the quantized, mid-level transconductance and the peak transconductance, and $\rho_c$ is the ratio of the baseband voltage gains used in the harmonic recombining network for the $F_C$ clock.

In some embodiments, the mixer-first architecture with the incorporated, double-conversion LNTA branches as described herein can only cancel part of the noise of the baseband termination resistors shown in FIG. 3. Because of the configuration of the HR termination network, some of the noise appears with the same conversion polarity at the outputs of the two signal branches, and some appear in with an opposite conversion polarity. For example, the noise due to the shunt $2R_B$ and $(2+\sqrt{2})R_B$ resistors in the mixer-first branches will produce outputs with an opposite polarity, whereas the noise due to the series $2R_B$ and $(2\sqrt{2})R_B$ resistors produces outputs with the same polarity.

As described above, in some embodiments, the circuit of FIG. 1 can operate in a single-carrier reception mode. In this mode, the passive mixers of the LNTA branches are driven by the same 8-phase 12.5%-duty cycle, non-overlapping clocks at $F_C$ as those for the mixer-first branches. The noise factor after cancellation when in this mode, $F_{NC,SNGL}$, can be represented by:

$$F_{NC,SNGL} = \frac{\overline{v_{no,SNGL}^2}/\Delta f}{2 \cdot 4kTR_S \cdot \left[\frac{R_{SW} + \eta R_B}{R_S + R_{SW} + \eta R_B} \cdot (CG_{LB,SNGL} - K \cdot CG_{MFB,SNGL})\right]^2} \quad (17)$$

where $\overline{v_{no,SNGL}^2}/\Delta f$ is the total noise at the combined output, k is the Boltzmann constant, and T is temperature.

By properly selecting the value of K (the coefficient to adjust the relative gain of the two LNTA branches, which can be found by simulation), the noise due to any of the resistors is 303 of FIG. 3 and the baseband op-amps can be partially cancelled.

In some embodiments, when the circuit of FIG. 1 is operating in dual-carrier reception mode and is being modulated by 8-phase in-phase and quadrature-phase DDSs, the noise factor after sideband separation with noise cancellation, $F_{NC,DUAL}$, can be represented by:

$$F_{NO,DUAL} = \frac{\overline{v_{no,DUAL}^2}/\Delta f}{2 \cdot 4kTR_S \cdot \left[\frac{2R_{SW} + 2\eta^2 \cdot R_B}{R_S + 2R_{SW} + 2\eta^2 \cdot R_B} \cdot (CG_{LB,DUAL} - K \cdot CG_{MFB,DUAL})\right]^2} \quad (18)$$

where $\overline{v_{no,DUAL}^2}/\Delta f$ is the total noise at the combined output.

In some embodiments, the bandwidth at the RF input node should cover all significant higher-order harmonics (e.g, the 3rd, 5th, 7th, and 9th clock harmonics for 8-phase receivers) to avoid a large NF degradation. E.g., the bandwidth at the RF input node should be greater than 4900 MHz for $F_C$=700 MHz.

Figure 8:
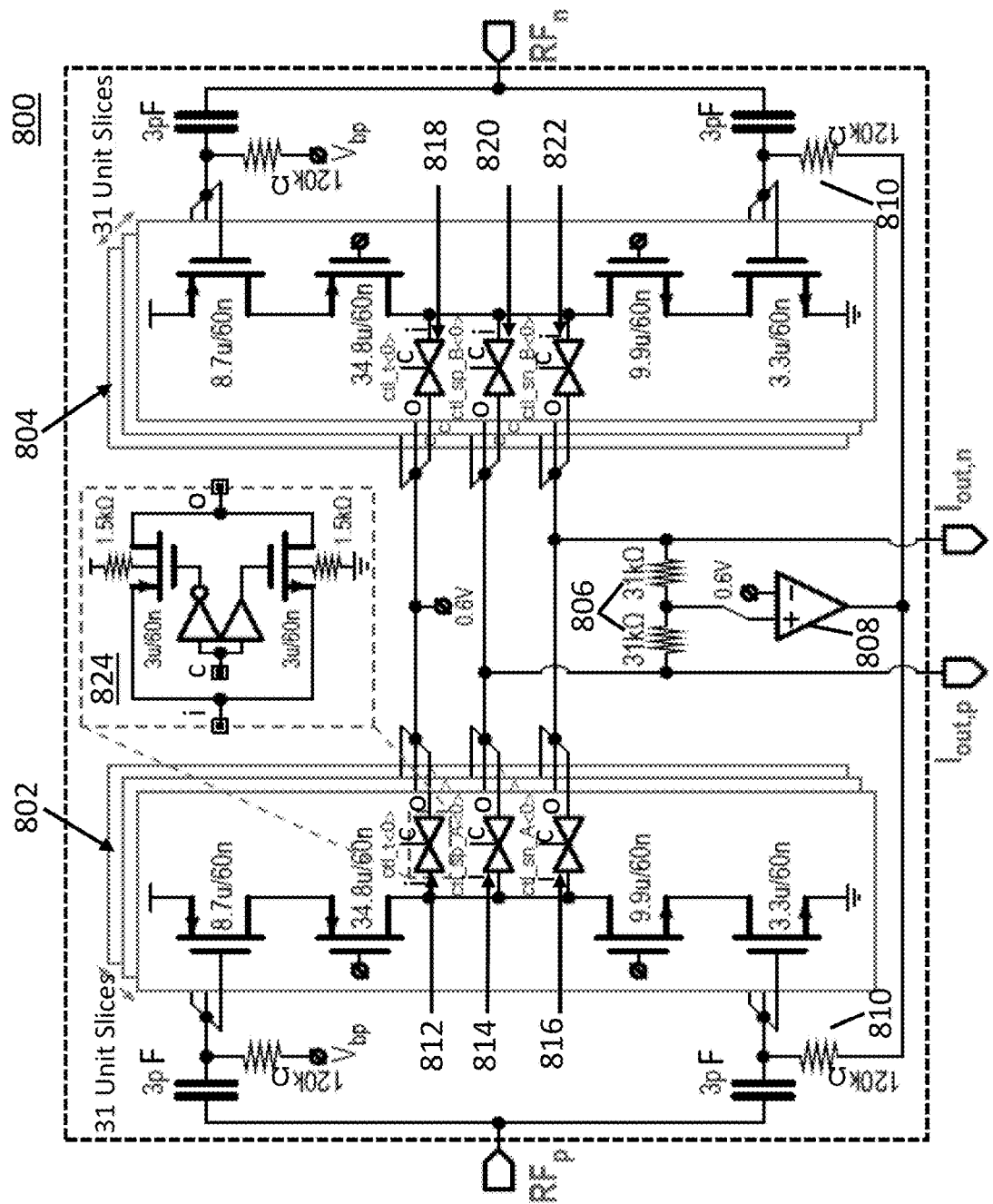
FIG. 8 is an example of a schematic of a low noise transconductance amplifier of a receiver in accordance with some embodiments.

Turning to FIG. 8, an example 800 of a schematic of a differential modulated low noise transconductance amplifier (LNTA) that can be used to implement LNTAs 730 and 732 of FIG. 7 in accordance with some embodiments is shown.

As illustrated in FIG. 8, the differential modulated LNTA uses two cascoded common-source amplifiers 802 and 804. In some embodiments, there can be 31 (or any other suitable number) identical unit slices in each of the cascoded common-source amplifiers. As also shown, all 31 (or any other suitable number) of the unit slices share a central common-mode feedback circuit (comprising resistors 806, operational amplifier 808, and resistors 810) for stabilized DC operating points.

In some embodiments, the common-source devices can be sized for a (gm/ID) of 10 (or any other suitable number) for good linearity, and the cascoded devices can be sized for a (gm/ID) of 16 (or any other suitable number) for good noise performance.

In some embodiments, to enable or disable a slice rapidly during modulation, the output of each unit slice can be connected to a switch matrix (e.g., formed by transmission gates 812-822 in FIG. 8) that conducts the RF current to either the subsequent mixing stage (via transmission gates 814, 816, 820, and 822 controlled by ctl_sp_A<0:30>, ctl_sn_A<0:30>, ctl_sp_B<0:30>, ctl_sn_B<0:30>), respectively, or a dummy low-impedance termination (e.g., 0.6V at the output (o) of transmission gates 812 and 818 controlled by ctl_t<0:30>).

As shown in FIG. 8, each of transmission gates 812-822 can be formed as shown in 824.

In some embodiments, the operating frequency of each LNTAs is limited by the junction capacitances from drain and source terminals of the LNTA to the substrate. These capacitances stem from the cascoded devices and the switch matrices. In some embodiments, to mitigate these capacitances, the switches in all of the switch matrices after each unit slice can be designed with transmission gates using low-voltage CMOS technology (LVT) devices with floating bodies to rails. In some embodiments, for the same purpose, the 8-phase mixers can use transmission gates that are also floating their bodies to rails. In some embodiments, this approach can result in each mixer cell having a 20% reduction in parasitic capacitance with 80 switch resistance.

Figure 9:
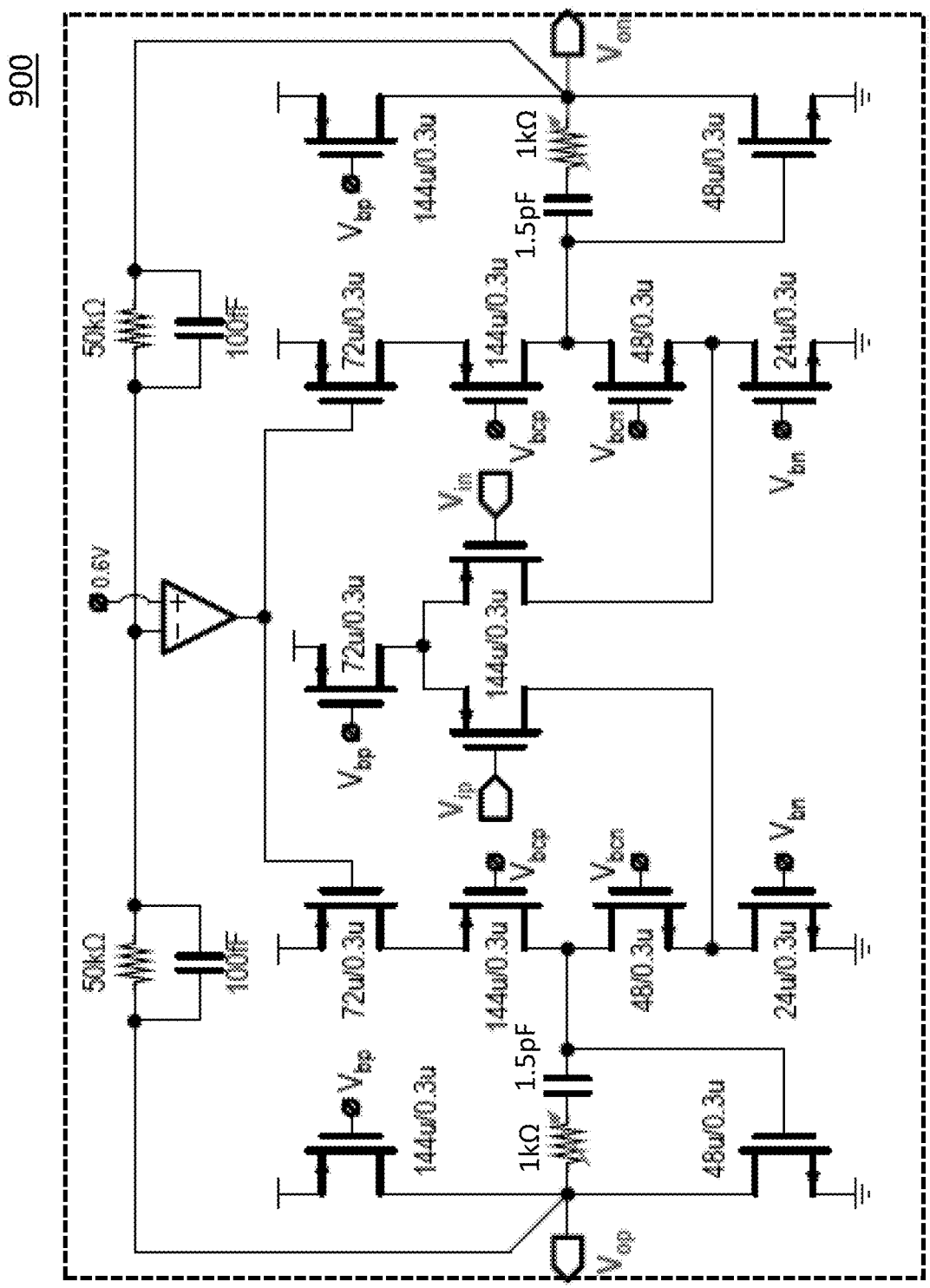
FIG. 9 is an example of Miller compensated trans-impedance amplifiers of a receiver in accordance with some embodiments.

Turning to FIG. 9, an example 900 of a schematic of a Miller-compensated operational amplifier that can be used to implement baseband transimpedance amplifiers of low-noise transconductance amplifier (LNTA) branches 104 and multiple double-conversion mixer-first branches 106 of FIG. 1 in some embodiments is shown.

In some embodiments, the TIAs can use programmable feedback resistors and programmable feedback capacitors for gain control and bandwidth control, respectively.

In some embodiments, each TIA has an equivalent, differential 15 pF capacitor at its inputs to attenuate the down-converted, out-of-band blocking signals.

It is noted that in FIGS. 8 and 9, certain component sizes and voltages are shown. It should be understood that these sizes and voltages are merely for purposes of illustration and that any suitable component sizes and voltages can be used in some embodiments.

The trace routing resistance from the mixer outputs to the baseband TIA inputs limits the linearity of the signal branch. In some embodiments, multiple thin metal layers can be stacked to bring the routing resistance below 30. This resistance can be further reduced with CMOS processes that offer more ultra-thick metal (UTM) layers in some embodiments.

In some embodiments, for the non-overlapping mixer clocks at $F_C$, differential input clocks running at $4 \cdot F_C$ can be first divided by four using standard, 4-stage CMOS latches, producing 8-phase 50%-duty-cycle clocks, and then NOR logic gates can be used to generate the 8-phase 12.5%-duty-cycle, non-overlapping clocks. In some embodiments, the nonoverlapping mixer-clocks at $F_M$ can be generated in the same way.

In some embodiments, to accommodate the need for different DDS clock rates, extra reconfigurable clock dividers can be used to support 8-phase and 16-phase DDS modulation with higher input clock rates.

In some embodiments, direct digital synthesizer circuits 710 and 720 in LNTA branches 702 and 704, respectively, are designed to vary the LNTA transconductances sinusoidally with a period of $1/F_M$. In some embodiments, direct digital synthesizer circuits 710 and 720 each contains a phase accumulator with programmable accumulating increments, a 7-bit-wide, 32-depth flip-flop-based SRAM as its look-up table, a thermometer-like logic decoder, and 31 drivers for each LNTA unit slice switch matrix.

In some embodiments, in the digital domain, gain and I/Q phase imbalances can be compensated and the signals then harmonically combined to reject 3rd and 5th $F_C$ harmonics. Sideband separation can also be performed to extract I/Q information from each RF carrier in some embodiments.

In some embodiments, for concurrent dual-carrier reception, if, for example, the lower RF carrier is targeted, a single-point calibration can be performed by first injecting a continuous wave tone near the higher RF carrier with a 2 MHz intermediate frequency and acquiring the coefficients for gain and phase mismatches to cancel this tone at the low-band baseband output.

In some embodiments, more sophisticated compensation techniques, like multi-tap adaptive filtering, can be used for further improvement in harmonic rejection and sideband separation.

The resulting calibration coefficients can be used for measurements in some embodiments.

In some embodiments, noise cancellation can be realized by first performing complex baseband shifting and weighting to the mixer-first branch I/Q outputs and then summing these outputs with the LNTA branch outputs.

To cancel the termination noise from the mixer-first branches, standard mixer-first branches arranged in a double-conversion fashion can be used in some embodiments. More particularly, in some embodiments, the outputs of the second-layer, 8-phase mixer switches can be connected to corresponding input of a TIA (one for each mixer) each by a resistor $R_B$, and harmonic recombination can be realized afterward. The noise due to these termination resistors at the outputs of the two signal branches may appear as common mode, whereas the desired signals may appear differential. Then, the termination noise can be fully cancelled, and the system's noise factor becomes:

$$F_{NC} \approx \frac{1}{\operatorname{sinc}^4(\pi/8)} \cdot \left\{1 + \frac{\gamma}{G_{m,pk} R_S} \cdot \left[\frac{1}{2} + \cos\left(\frac{\pi}{4}\right)\right]\right\} \quad (19)$$

In some embodiments, as the number of clock phases increases, the number of TIAs can also be increased. However, to maintain the same noise performance, the TIA operational amplifiers can be sized down, and the TIA feedback resistance can be sized up the same amount in some embodiments.

In some embodiments, more conversion stages can be used to receive more signals by putting one or more extra set of mixers before the first layer mixers. For example, to concurrently receive four carriers at $(F_C \pm F_M \pm F_N)$, three layers of passive mixing can be used in the mixer-first branch clocked at $F_C$, $F_M$, and $F_N$ with $F_C > F_M > F_N$.

The low-pass, baseband impedance is then first converted to $F_N$, then to $(F_M \pm F_N)$, and next to $(F_C \pm F_M \pm F_N)$, thus offering narrow-band tuned impedance matching at four distinct frequencies. Signals at those frequencies are downconverted to baseband and can be separated using addition and subtraction circuits. Similarly, more conversion stages can be included after the modulated LNTAs. In this case, the LNTAs are modulated at $F_N$ and are followed by two passive-mixing layers clocked at $F_M$ and $F_C$, respectively. However, more passive mixing layers require more series RF switches, resulting in a larger equivalent switch resistance and more complicated signal routing.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for a receiver, comprising:
   M first mixers that each receive an input signal, that are each clocked by a different phase of a first common clock frequency, and that each provide an output, wherein M is a count of the first mixers;
   M sets of N second mixers, wherein N is a count of the second mixers in each of the M sets, wherein each second mixer in each set of N second mixers receives as an input the output of a corresponding one of the M first mixers, wherein each of the N second mixers in each of the M sets are clocked by a different phase of a second common clock frequency, and wherein each of the second mixers has an output;
   M harmonic rejection termination networks that each receive the outputs of the N second mixers in a corresponding one of the M sets, and that each provide an in-phase output and a quadrature-phase output;
   M in-phase trans-impedance amplifiers that each receive the in-phase output from a corresponding one of the M harmonic rejection termination networks and that each provide an in-phase baseband output signal; and
   M in-phase trans-impedance amplifiers that each receive the quadrature-phase output from a corresponding one of the M harmonic rejection termination networks and that each provide an quadrature-phase baseband output signal.

2. The circuit of claim 1, further comprising:
   a plurality of low noise transconductance amplifier branches each comprising:
      a transconductor having an input connected to the input signal and a transconductor output signal;
      M third mixers that each receive a corresponding one of the transconductor output signals, that are each clocked by a different phase of the first common clock frequency, and that each provide a third mixer output signal; and
      M filters that each receive a corresponding on of the third mixer output signals and provide a filtered output signal.

3. The circuit of claim 2, wherein the transconductor comprises a plurality of transconductor unit cells that individually controllable.

4. The circuit of claim 3, wherein each of the plurality of low noise transconductance amplifier branches further comprises a direct digital synthesis circuit the controls the plurality of transconductor unit cells.

5. The circuit of claim 4, wherein the direct digital synthesis circuit comprises:
   a numerically controllable oscillator; and
   an accumulator.

6. The circuit of claim 1, further comprising a harmonic recombination circuit.

7. The circuit of claim 6, further comprising a sideband separation circuit.

8. The circuit of claim 1, wherein each of the first mixers is differential and clocked by two phases at the first common clock frequency each having a 12.5% duty cycle.

9. The circuit of claim 8, wherein each of the second mixers is differential and clocked by two phases at the second common clock frequency each having a 12.5% duty cycle.

* * * * *

UNITED STATES PATENT AND TRADEMARK OFFICE
CERTIFICATE OF CORRECTION

| | | |
|---|---|---|
| PATENT NO. | : 11,705,932 B2 | Page 1 of 1 |
| APPLICATION NO. | : 17/176349 | |
| DATED | : July 18, 2023 | |
| INVENTOR(S) | : Guoxiang Han et al. | |

It is certified that error appears in the above-identified patent and that said Letters Patent is hereby corrected as shown below:

In the Specification

Column 1, Line 13, Please add the following paragraph and header:
--STATEMENT REGARDING FEDERALLY SPONSORED RESEARCH OR DEVELOPMENT
This invention was made with government support under grant 1733857 awarded by the National Science Foundation. The government has certain rights in the invention.--

Signed and Sealed this
Twenty-ninth Day of August, 2023

Katherine Kelly Vidal
*Director of the United States Patent and Trademark Office*